(12) United States Patent
Wellman et al.

(10) Patent No.: US 10,983,190 B2
(45) Date of Patent: Apr. 20, 2021

(54) PNT SENSOR RELAY COMMUNICATION SYSTEM

(71) Applicant: RAYTHEON COMPANY, Waltham, MA (US)

(72) Inventors: Cassandra L. Wellman, St. Petersburg, FL (US); Alexandra Cintron-Aponte, St. Petersburg, FL (US); Alan K. Rubin, Largo, FL (US); Angel V. Arroyo, Pinellas Park, FL (US); Angel J. Rios, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 1240 days.

(21) Appl. No.: 14/454,176

(22) Filed: Aug. 7, 2014

(65) Prior Publication Data

US 2016/0041252 A1     Feb. 11, 2016

(51) Int. Cl.
*G01S 19/13*     (2010.01)
*G01S 5/02*      (2010.01)
*G01S 19/49*     (2010.01)
*G01C 21/16*     (2006.01)

(52) U.S. Cl.
CPC .............. *G01S 5/02* (2013.01); *G01C 21/165* (2013.01); *G01S 5/0263* (2013.01); *G01S 19/13* (2013.01); *G01S 19/49* (2013.01)

(58) Field of Classification Search
CPC ....................................................... G01S 5/0263
USPC ...................................................... 342/357.51
See application file for complete search history.

(56) References Cited

U.S. PATENT DOCUMENTS

| | | | | |
|---|---|---|---|---|
| 9,188,659 | B2* | 11/2015 | Siomina | G01S 19/49 |
| 2004/0239559 | A1* | 12/2004 | King | G01S 19/21 |
| | | | | 342/357.59 |
| 2005/0010364 | A1* | 1/2005 | Moser | G01C 21/165 |
| | | | | 701/472 |
| 2008/0129547 | A1* | 6/2008 | Shinoda | G08G 1/205 |
| | | | | 340/991 |
| 2008/0294302 | A1* | 11/2008 | Basir | G01C 21/20 |
| | | | | 701/2 |
| 2012/0295623 | A1* | 11/2012 | Siomina | H04W 64/00 |
| | | | | 455/436 |

(Continued)

OTHER PUBLICATIONS

Darpa, [online]; [retrieved on Aug. 7, 2014]; retrieved from the Internet http://www.darpa.mil/Our_Work/MTO/Programs/Micro-Technology_for_Positioning,_Navigation_and_Timing_(Micro-PNT).aspx R. Lutwak, "Micro-Technology for Positioning, Navigation and Timing (MICRO-PNT)," Darpa, 2014, pp. 1-2.

*Primary Examiner* — Erin F Heard
*Assistant Examiner* — Helena H Seraydaryan
(74) *Attorney, Agent, or Firm* — Cantor Colburn LLP

(57) ABSTRACT

A PNT sensor short-range relay communication system includes an electronic PNT sensor module configured to determine a first position of the PNT sensor module and to output a PNT signal indicating a second position of the PNT sensor module with respect to the first position. A mobile relay module is in signal communication with the PNT sensor module. The mobile relay module is configured to communicate the PNT signal to at least one terminal device located remotely from the PNT sensor module and the mobile relay module. In this manner, positional information can be determined without relying on a satellite navigation system.

16 Claims, 5 Drawing Sheets

(56) References Cited

U.S. PATENT DOCUMENTS

| | | | | |
|---|---|---|---|---|
| 2013/0211713 A1* | 8/2013 | Georgy | ............ | G01S 19/47 |
| | | | | 701/468 |
| 2014/0097984 A1* | 4/2014 | Stevens | ............ | G01S 19/20 |
| | | | | 342/357.58 |
| 2014/0171062 A1* | 6/2014 | Fallgren | .......... | H04W 40/22 |
| | | | | 455/422.1 |

* cited by examiner

PNT SENSOR RELAY COMMUNICATION SYSTEM

BACKGROUND

The present disclosure relates to positioning, navigation and timing (PNT) sensors, and more specifically, to a PNT sensor relay communication system.

Conventional object positioning and/or navigation systems rely on satellite navigation systems to determine the location of one or more objects. The United States, for example, operates the Global Positioning Satellite (GPS) system. The GPS system is a space-based satellite navigation system that is utilized by a wide-variety of communication devices and provides location and time information in all weather conditions, anywhere on or near the Earth where there is an unobstructed line of sight to four or more GPS satellites. If, however, one or more of the satellites fail and/or the GPS system succumbs to an electronic warfare attack, there may be no way of determining locations of one or more desired objects.

SUMMARY

According to an embodiment, a PNT sensor short-range relay communication system includes an electronic PNT sensor module configured to determine a first position of the PNT sensor module and to output a PNT signal indicating a second position of the PNT sensor module with respect to the first position. A mobile relay module is in signal communication with the PNT sensor module. The mobile relay module is configured to communicate the PNT signal to at least one terminal device located remotely from the PNT sensor module and the mobile relay module.

According to another embodiment, a method of determining a position of an object without using a satellite navigation system comprises measuring a plurality of different quantities of the object using a PNT module coupled thereto in response to moving the object from a first position to a second position. The method further includes transmitting the measured quantities to a mobile relay module located remotely from the PNT sensor module at a first communication range. The method further includes relaying the measured quantities from the mobile relay module to at least one terminal device located remotely from the mobile relay module at a second communication range that is greater than the first communication range. The method further includes determining a location of the second position based on the measured quantities without communicating with the satellite navigation system.

Additional features are realized through the techniques of the present invention. Other embodiments of the invention are described in detail herein and are considered a part of the claimed invention. For a better understanding of the invention and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
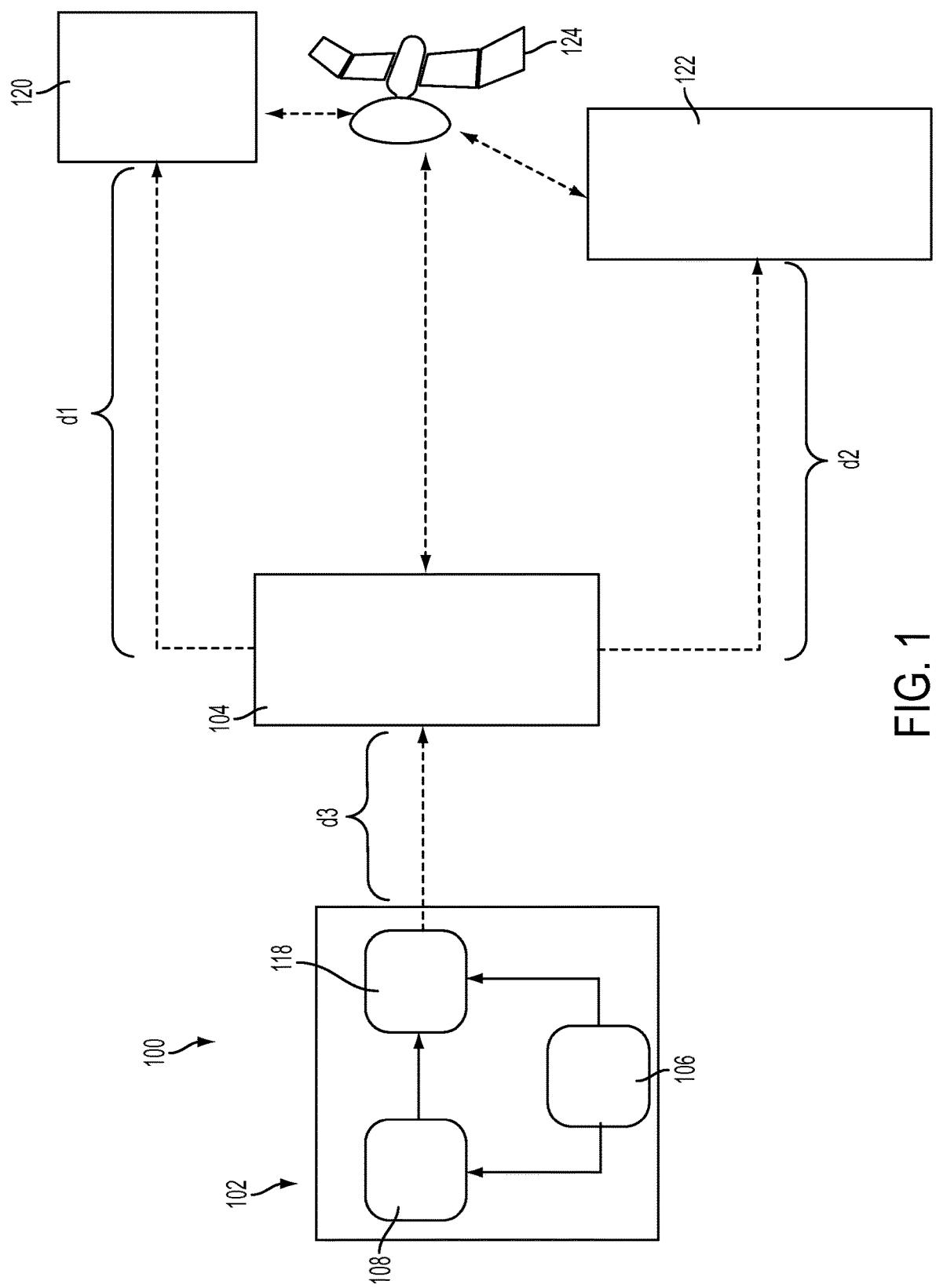
FIG. 1 is a block diagram illustrating a PNT sensor short-range relay communication system according to an exemplary embodiment.

Referring to FIG. 1, a PNT sensor short-range relay communication system 100 is illustrated according to an exemplary embodiment. The system 100 includes an electronic PNT sensor module 102 and an electronic mobile relay module 104. The PNT sensor module 102 is configured to determine a first position (e.g., an initial reference) of the PNT sensor module 102 and to output a PNT signal indicating a second (moved) position of the PNT sensor module 102 with respect to the first position. Unlike conventional positioning modules, the PNT sensor module 102 has an overall compact size. According to an embodiment, the PNT sensor module 102 has an overall size of approximately 8.0 cubic millimeters (mm). The PNT sensor module 102, therefore, may be coupled to various objects such as, for example, firearms, personal identification tags, munitions, decoy devices, etc., which may be easily carried and transported. In this manner, a plurality of different quantities (i.e., angular momentum, orientation, acceleration, speed, magnetic field strength and a time period over which the object moves) can be measured when the object moves.

According to at least one embodiment, the PNT sensor module 102 can execute an initialization operation that obtains the first position. The first position can be manually input to the PNT sensor module 102 and/or can be transmitted from the mobile relay module 104. For example, a user of the PNT sensor 108 can manually input satellite navigation data such as, for example, global positioning satellite (GPS) coordinates, indicating an initial reference position. The satellite positioning coordinates can also be received from the mobile relay module 104 in reply to a reference position request signal. According to an embodiment, the frequency at which the reference position request signal is output is based on a reference position request schedule. For example, the reference position request schedule can control the reference position request signal to be output every few minutes, on an hourly basis, on a daily basis, etc.

The PNT sensor module 102 includes a power supply 106 and a PNT sensor 108 configured to measure a plurality of different physical quantities realized by the PNT sensor module 102. The measured quantities are in turn used to determine the second position data without using satellite navigation 124 data such as, for example, global positioning satellite (GPS) coordinate data. That is, although an initial reference position may be obtained using satellite positioning coordinates, the second position is based solely on the information provided by the PNT sensor module 102 without using satellite navigation data.

Figure 2:
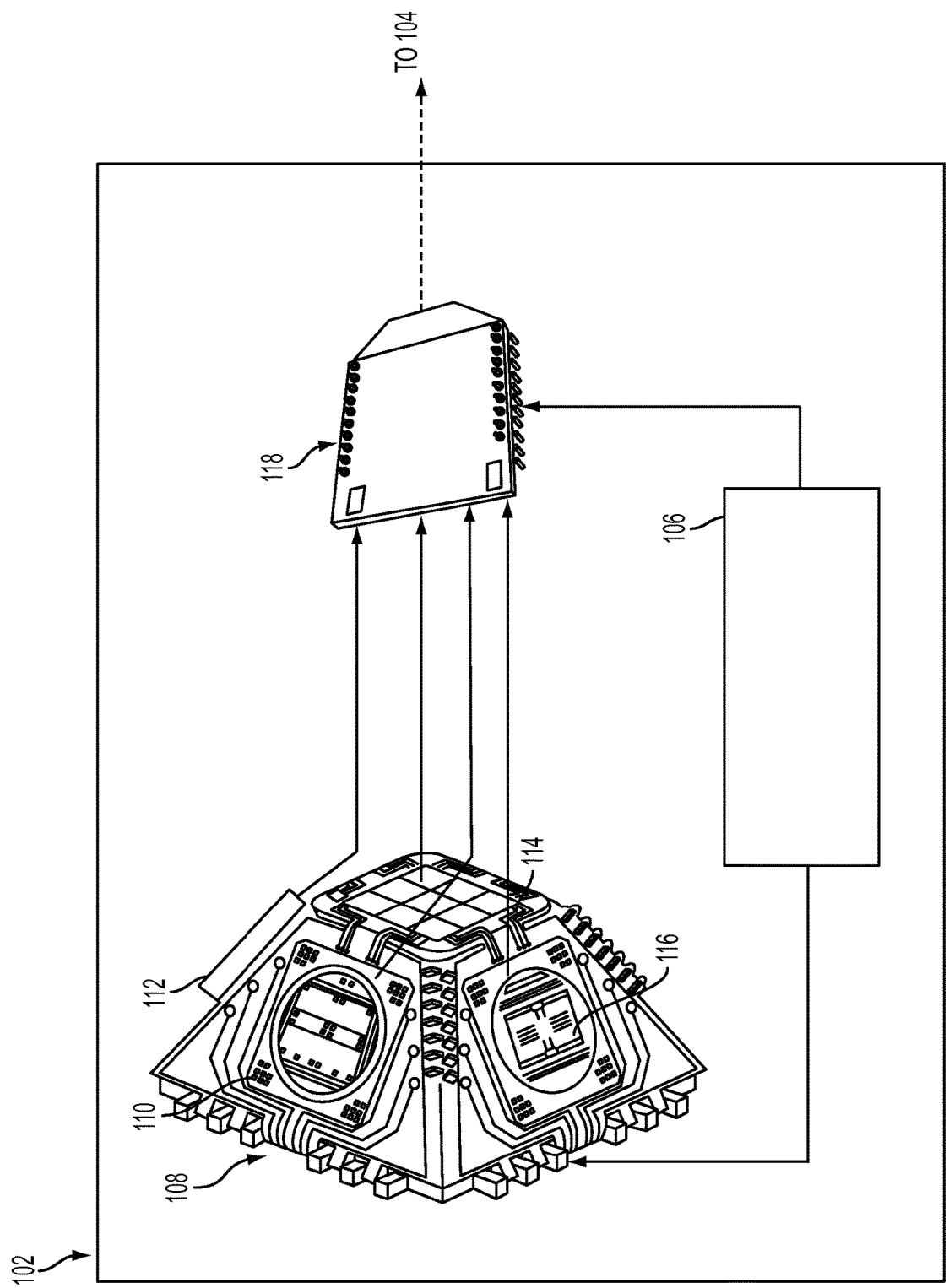
FIG. 2 illustrates a PNT sensor module according to an exemplary embodiment.

Referring to FIG. 2, the PNT sensor module 102 comprises various sub-units that measure a respective quantity. The sub-units of the PNT sensor module 102 include, but are not limited to, a gyroscope unit 110, an accelerometer unit 112, a magnetometer unit 114, and a timing unit 116. The gyroscope unit 110 is configured to sense an angular momentum and determine an orientation of the PNT sensor module 102 based on the sensed angular momentum. The accelerometer unit 112 is configured to sense speed and/or acceleration of the PNT sensor module 102. The magnetometer unit 114 is configured to determine a magnetic field of the Earth and determine a position of the PNT sensor module 102 based on the magnetic field. The timing unit 116 includes, for example, an atomic clock, and is configured to determine a time period over which one or more of the sub-units measure data. It is appreciated that the PNT sensor module 102 is not limited to the arrangement of sub-units illustrated in FIG. 2. The PNT sensor module 102 may include various combinations of the sub-units. For example, the PNT sensor module 102 may include the gyroscope unit 110, the accelerometer unit 112, and the timing unit 116, while excluding the magnetometer unit 114.

The individual data measurements provided by each respective sub-unit can be used to determine the second position. For example, the acceleration of the measured accelerometer unit 112 can be integrated to determine the speed of the PNT sensor module 102. Based on the speed and a time period monitored by the timing unit 116 over which the speed is determined, a distance of the PNT sensor 108 can be determined. Accordingly, a distance indicative of a second moved position with respect to the first (initial reference) position can be determined without using satellite positioning data such as, for example, GPS coordinates.

The PNT sensor module 102 further includes a wireless transceiver 118 configured to communicate data between the PNT sensor 108 and the mobile relay module 104. According to an embodiment, the wireless transceiver 118 is a low-power wireless transceiver 118 configured to communicate the data using, for example, short-wavelength ultra high frequency (UHF) radio waves in a radio band range of, for example, approximately 2.4 GHz to approximately 2.485 GHz. It is appreciated that the aforementioned radio band range is not limited thereto. The low-power wireless transceiver 118 includes, but is not limited to, a Bluetooth transceiver or an infrared (IR) light emitting diode (LED).

The power supply 106 is configured to power the PNT sensor 108 and the wireless transceiver 118. Various types of energy sources may be used to form the power supply 106 including, but not limited to, a battery, a piezoelectric energy device (e.g., a kinetic energy device), a saltwater power cell, and a solar power cell. According to an embodiment, the energy of the power supply 106 may be conserved by selectively controlling the PNT sensor 108 to operate at full-operation mode and at sleep mode. While operating in the full-operation mode, the sub-units of the PNT sensor 108 continuously sense respective movements and time to determine the second position of the PNT sensor module 102 as discussed above. In sleep mode, however, the sub-units do not operate such that the energy of the power supply 106 is conserved. The PNT sensor 108 can be switched in and out of sleep mode in response to an enable signal input by a user and/or from an enable signal output from the mobile relay module 104. In this manner, The PNT sensor module 102 can be automatically activated (i.e., switched from sleep mode into full-operation mode) when communication between the mobile relay module 104 and the satellite navigation system 124 is lost. When communication between the mobile relay module 104 and the satellite navigation system 124 is reestablished, the PNT sensor module 102 can be automatically deactivated (i.e., switched back into sleep mode) and positioning can again be determined using the satellite navigation system 124.

The mobile relay module 104 is signal communication with the PNT sensor module 102 and one or more terminal devices. The signal communicate can be achieved via wireless communication, for example. The terminal devices include, for example, a paired mobile relay module 120 and/or a main data communication center 122 that is signal communication with a satellite navigation system 124. The paired mobile relay module 120 and the main data communication center 122 may be remotely located at respective distances (d1, d2) from the mobile relay module 104. According to an embodiment, the mobile relay module 104 is also be configured to communicate directly with a satellite navigation system 124.

Data such as the reference position request signal, satellite navigation data, the PNT signal, enable signal, etc., is communicated between the PNT sensor 108 and the mobile relay module 104 via the wireless transceiver 118. The mobile relay module 104 includes various communication devices including, but not limited to, an unmanned vehicle (e.g., a UAV), a floating buoy, and a hand-held radio terminal. In this regard, the mobile relay module 104 can determine a precise real-time position by communicating directly with one or more paired relay modules, the main data communication center 122, or directly with the satellite navigation system 124.

The mobile relay module 104 is located a close distance (d3) from the PNT sensor module 102 (see FIG. 1), while still achieving signal communication with the wireless transceiver 118. The distance (d3) may extend up to approximately 100 meters (m) when communicating with a class 1 Bluetooth transceiver, for example, and 1.5 kilometers (km) when communicating with an infrared light emitting diode (IR LED), for example. In this manner, the PNT sensor 102 moves with respect to the mobile relay module 104 and transmits the PNT signal thereto. In turn, the relay module 104 relays the PNT signal to the one or more paired mobile relay modules 120 and/or the main data communication center 122. The relay module 104 can be coupled to various objects including, but not limited to, an unmanned vehicle, a floating buoy, etc. The paired mobile relay modules 120 and/or the main data communication center 122 determine the position of the PNT sensor module 102 based on the PNT signal. Accordingly, a position of the PNT sensor module 102 can be determined without relying on the satellite navigation system 124.

Figure 3:
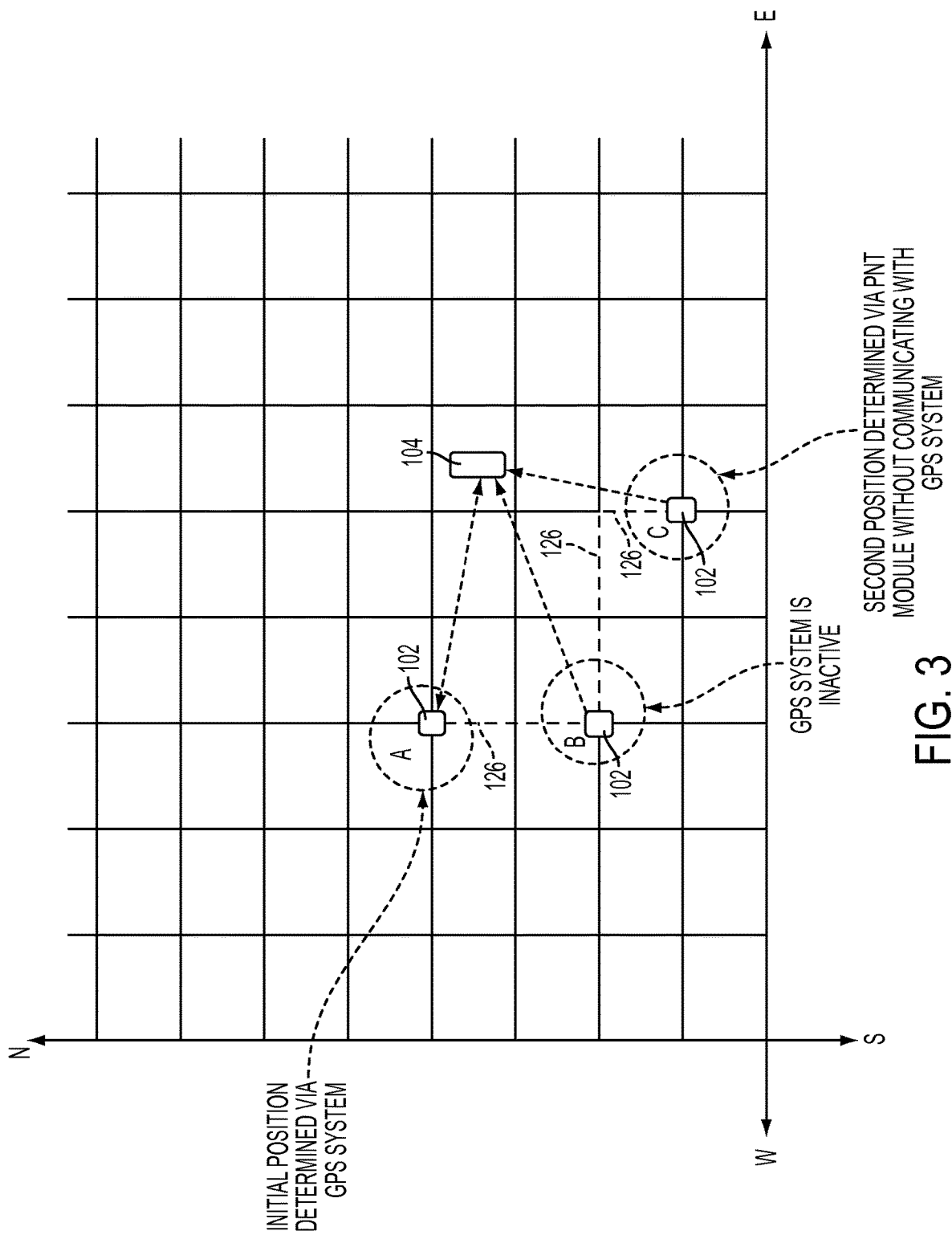
FIG. 3 illustrates operation of the PNT sensor short-range relay communication system while traveling from a first position "A" to a final position "C" according to an exemplary embodiment.

Referring to FIG. 3, for example, the PNT sensor module 102 and the mobile relay module 104 are initialized at a first position (i.e., initial position) indicated as position "A". This operation allows for the PNT sensor module 102 to be used while satellite navigation data is provided to the mobile relay module 104. In this manner, the PNT sensor module 102 can confirm navigation data provided by a satellite navigation system 124. For example, at position "A", the PNT sensor module 102 requests data from the mobile relay module 104 identifying the location of position "A". Based on the request, the mobile relay module 104 obtains the satellite positioning coordinates from the satellite navigation system 124 or from user input and automatically transmits the coordinates to the PNT sensor module 102 via the wireless transceiver 118. After determining the initial position "A", the PNT sensor module 102 travels to position "B" while the sub-units of the PNT sensor 108 determine the speed, direction, distance and/or time of travel between position "A" and position "B". In this manner, the PNT sensor module 102 can confirm the satellite navigation data provided by the satellite navigation system 124, thereby determining whether a satellite navigation system has been compromised to purposely output incorrect satellite navigation data.

At position "B", The PNT sensor module 102 transmits a PNT signal indicating the determined speed, direction, distance and/or time traveled to the mobile relay module 104 via the wireless transceiver 118. In this manner, the location of the PNT sensor module 102 at position "B" can be determined without communicating with a satellite navigation system. Although the PNT sensor module 102 is described as transmitting the PNT signal when reaching position "B", it is appreciated that PNT sensor module 102 can continuously transmit the PNT signal while travelling toward position "B."

The PNT sensor module 102 then changes direction and begins travelling toward position "C". In this manner, the sub-units of the PNT sensor 108 determine the speed, direction, distance and/or time of travel between position "B" and position "C". Upon reaching position "C", the PNT sensor module 102 transmits a PNT signal indicating the determined speed, direction, distance and/or time traveled to the mobile relay module 104 via the wireless transceiver 118. The mobile relay module 104, in turn, communicates the determined speed, direction, distance and/or time traveled to the paired mobile relay modules 120 and/or the main data communication center 122. Accordingly, the second position "C" is ultimately determined without relying on the satellite navigation system 124.

In another embodiment, the PNT sensor module 102 is included in an electronic navigation module that continuously compares PNT sensor data with satellite navigation data received from the satellite navigation system 124. When the satellite navigation data fails to match the PNT sensor data, or diverges from the PNT sensor data by a threshold amount, the navigation module may automatically determine that the satellite navigation system 124 has been compromised and/or the navigation system has been compromised (i.e., hacked) to receive false satellite navigation data. In response to detecting the system hack, the electronic navigation module may disconnect communication with the satellite navigation system 124 and/or disregard satellite navigation data, and rely solely on the PNT sensor data for navigation. It is envisioned that the electronic navigation module including the PNT sensor module 102 can be installed in an unmanned vehicle (UV), for example. In this manner, the UV can disregard false satellite navigation data.

According to a non-limiting embodiment, the mobile relay module 104 is located remotely from the PNT sensor module 102, and is configured to move simultaneously together with the PNT sensor module 102 while relaying the PNT signal to one or more paired mobile relay modules 120 and/or the main data communication center 122. The paired mobile relay modules 120 and/or the main data communication center 122 determine the position of the PNT sensor module 102 based on the PNT signal. Accordingly, a position of the PNT sensor module 102 can be determined without relying on the satellite navigation system 124.

Figure 4:
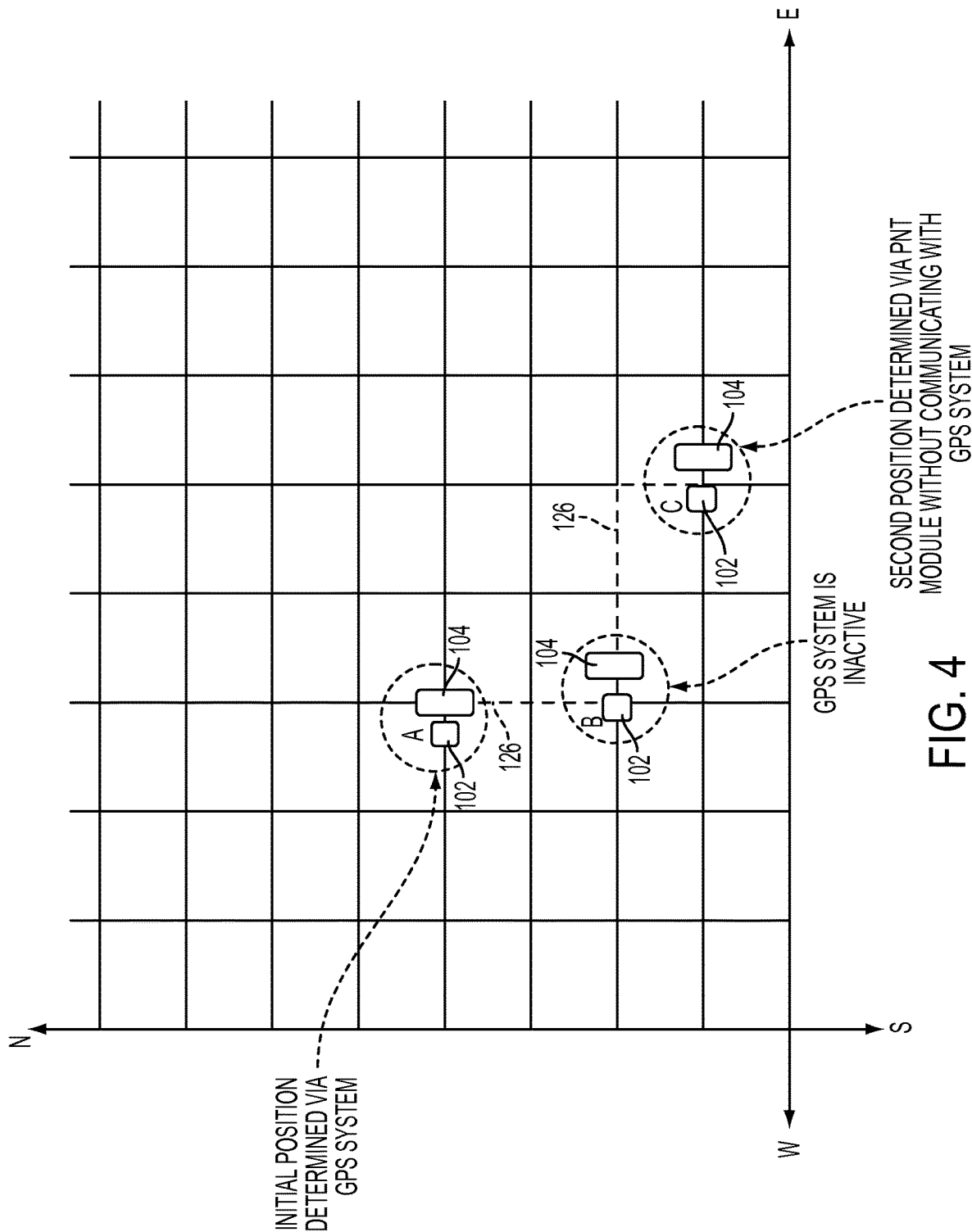
FIG. 4 illustrates operation of the PNT sensor short-range relay communication system while traveling from a first position "A" to a final position "C" according to another exemplary embodiment.

According to an embodiment, the PNT sensor 108 module is configured as a secondary positioning system (e.g., a backup positioning system), which supplements a primary position positioning system such as, for example, a satellite navigation system 124. Referring to FIG. 4, for example, the PNT sensor module 102 and the mobile relay module 104 are shown at a first position (i.e., position "A"). At position "A", the PNT sensor module 102 exists in a sleep mode to conserve energy, while the mobile relay module 104 obtains satellite navigation data. The satellite navigation data can be obtained automatically from the satellite navigation system 124 and/or manually via satellite navigation coordinates input from a user.

The PNT sensor module 102 and the mobile relay module 104 move together from position "A" when at position "B" the satellite navigation system 124 becomes inactive. Consequently, the positional data cannot be determined using satellite positioning data obtained from the satellite position system 124. According to an embodiment, the mobile relay module 104 detects the inactive satellite navigation system 124, and outputs the enable signal that switches the PNT sensor module 102 from sleep mode to full-operation mode. The mobile relay module 104 also transmits the last recorded satellite positioning coordinates to the PNT sensor module 102, to one or more remotely located paired mobile relay modules 120 and/or a main data communication center 122. In this manner, the position of the PNT sensor module 102 can be determined with respect a last known satellite positioning location (i.e., location "B") identified by the mobile relay module 104.

The PNT sensor module 102 and the mobile relay travel along a path 126 until reaching a second position "C". While in full-operation mode, the sub-units of the PNT sensor 108 determine the speed, direction, distance and/or time of travel between position "B" and position "C". The PNT sensor module 102 transmits a PNT signal indicating the determined speed, direction, distance and/or time traveled to the mobile relay module 104 via the wireless transceiver 118. The mobile relay module 104, in turn, communicates the determined speed, direction, distance and/or time traveled to the paired mobile relay modules 120 and/or the main data communication center 122. Accordingly, the second position "C" is ultimately determined despite the satellite navigation system 124 being inactive.

Due to the compact packaging of the PNT sensor 108, the PNT sensor module 102 may be implemented in a variety of applications. According to an embodiment, the PNT sensor 108, wireless transmitter 118 and power supply 106 can be integrated into existing military identification (ID) tags, or "dog tags," in order to track individual members of a tactical team to monitor mission progress. One or more members of the tactical team would also possess a mobile relay module 104 such as, for example, a long-range handheld radio terminal 104, configured to communicate with the wireless transmitter 118, the satellite navigation system 124, a paired mobile terminal 120 and/or a main communication center 122. In the event an electronic warfare attack causes the satellite navigation system 124 to become unavailable, the PNT sensor module 102 can be initiated. For example, hand-held radio terminal 104 can detect a communication loss with the satellite navigation system 124 and automatically activate the PNT sensor module 102 (i.e., switch the PNT sensor from sleep mode into full-operation mode) to begin gathering the PNT position data. The PNT sensor module can also be manually activated. Manual activation may be desirable if the PNT sensor module is used to obtain a second opinion of one or more positions, and/or if there is suspicion that the satellite navigation system 124 has been compromised. Once activated, the PNT positioning data can be transmitted to the proximately located hand-held radio terminal 104. In turn, the hand-held radio terminal 104 communicates with the PNT positioning data to mission leaders located at the main communication center 122 and/or other remotely located terminals 120. The hand-held radio terminal 104 uses a communication method different from the communication method used by the wireless transceiver. For example, the communication method used by the hand-held radio terminal 104 includes, but is not limited to, line-of-sight and beyond-line-of-sight communication. In this manner, movements, locations, and operations of the tactical team can be determined without using the satellite navigation system 124. According to an embodiment, the PNT sensor can be automatically deactivated (i.e., switched back into sleep mode) when the communication with the satellite navigation system 124 is reestablished.

According to another embodiment, the PNT sensor module 102 is configured to provide navigation data in a non-simultaneously moving system without using a navigation satellite system. In this embodiment, the mobile relay module 104 is formed as a non-simultaneously moving relay module 104. Accordingly, the PNT sensor module 102 can move independently with respect to the non-simultaneously moving relay module 104 while maintaining the range of communication. For example, the mobile relay module 104 is integrated into a life jacket, along with a water-activated strobe and a small salt water fuel cell. In response to sensing the water, the salt water fuel cell outputs power that activates the PNT sensor module and causes the strobe to emit light. The PNT sensor module can then begin transmitting PNT positioning data to mobile relay modules 104 integrated in buoys and/or objects located proximate to the life jacket. The mobile relay module 104, in turn, relays the PNT positioning data to one or more paired terminal devices 120 and/or a main communication center 122 to facilitate in aiding and rescuing persons lost at sea.

Figure 5:
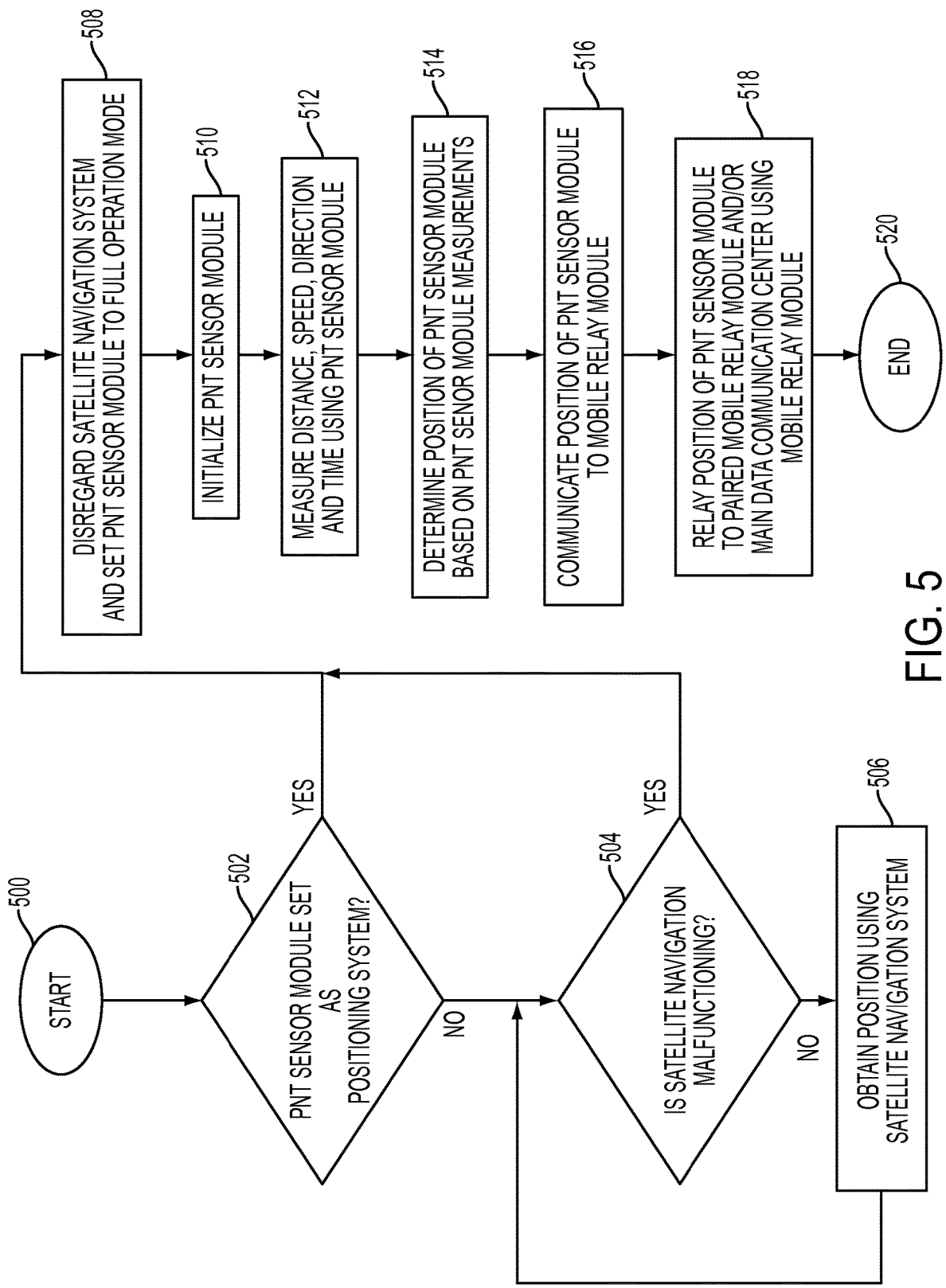
FIG. 5 is a flow diagram illustrating a method of determining a position using the PNT sensor short-range relay communication system according to an exemplary embodiment.

Referring now to FIG. 5, a flow diagram illustrates a method of determining a position using the PNT sensor 108 short-range relay communication system according to an exemplary embodiment. The method begins at operation 500, and at operation 502, a determination is made as to whether the PNT sensor module 102 is set as the positioning system. If the PNT sensor module 102 is set as the positioning system, the PNT sensor module 102 is set to full-operation mode at operation 508, which is described in greater detail below.

If the PNT sensor module 102 is not set as the positioning system, a determination is made as to whether a satellite navigation system is active. If the satellite navigation system is active, a first position of the PNT sensor module 102 and/or the mobile relay module 104 is determined using data provided by the satellite navigation system at operation 506, and the method returns to operation 504 to continue monitoring the operation status of the satellite navigation system.

If, however, the satellite navigation system is inactive at operation 504, the satellite navigation system is disregarded, and the PNT sensor module 102 is set to full-operation mode at operation 508. At operation 510, the PNT sensor module 102 is initialized. The initialization of the PNT sensor module includes receiving the last known satellite position coordinates from, for example, a mobile relay module 104 configured to communicate with a satellite navigation system 124. At operation 512, the PNT sensor module 102 measures various parameters including, but not limited to, distance, speed, direction and time. At operation 514, a second position of the PNT sensor module 102 with respect to the first position is determined based on the measured parameters without using data provided by the satellite navigation system 124. At operation 516, the second position is communicated to the mobile relay module 104. According to an embodiment, the second position is communicated using a low-power wireless transceiver 118 such as, for example, a Bluetooth transceiver. At operation 518, the mobile relay module 104 communicates the second position of the PNT sensor module 102 to one or more paired mobile relay modules 120 and/or a main data communication center 122, and the method ends at operation 520. In another embodiment, operations 512-518 are repeated until the satellite navigation positioning system 124 is restored. The use of the satellite navigation system 124 can be reestablished by manually switching off the PNT sensor module 102 and/or when the communication between the satellite navigation system 124 is reestablished. Accordingly, the second position is determined by the PNT sensor module 102 without using data provided by the primary positioning system. In this manner, a location of the PNT sensor module 102 can be determined despite a malfunction of the primary positioning system, such as a satellite navigation system 124.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As used herein, the term module refers to processing circuitry that may include an application specific integrated circuit (ASIC), an electronic circuit, an electronic processor (shared, dedicated, or group) and memory that executes one or more software or firmware programs, a combinational logic circuit, and/or other suitable components that provide the described functionality.

While the preferred embodiments to the invention have been described, it will be understood that those skilled in the art, both now and in the future, may make various changes which fall within the scope of the claims which follow. These claims should be construed to maintain the proper protection for the invention first described.

What is claimed is:

1. A PNT sensor short-range relay communication system comprising:

an electronic navigation module in signal communication with a satellite navigation system, the navigation module including an electronic PNT sensor module configured to move from a first position to a second position, and to determine the first position of the PNT sensor module and to output a PNT signal indicating the second position of the PNT sensor module with respect to the first position, the PNT signal generated according to a plurality of different physical quantities realized by the PNT sensor module, the physical quantities determined by a gyroscope unit configured to sense an angular momentum and determine an orientation of the PNT sensor module based on the sensed angular momentum, an accelerometer unit configured to sense an acceleration of the PNT sensor module, and a timing unit to determine a time period over which at least one of the gyroscope unit, the accelerometer unit and the magnetometer unit measures data; and a mobile relay module in signal communication with the PNT sensor module and the satellite navigation system, the mobile relay module configured to communicate the PNT signal to at least one terminal device located remotely from the PNT sensor module and the mobile relay module, wherein the mobile relay module is configured to move simultaneously together with the PNT sensor module, and wherein the navigation module disconnects the communication with the satellite navigation system in response to detecting a malfunction of the satellite navigation system, the malfunction of the satellite navigation system determined in response to detecting a hacking of the satellite navigation system.

2. The system of claim 1, wherein the at least one terminal device determines the position of the PNT sensor module based on the PNT signal without using satellite navigation system data.

3. The system of claim 2, wherein the PNT sensor module selectively determines the second position in response to receiving a PNT enable signal output from the mobile relay module.

4. The system of claim 1, wherein the PNT sensor module executes an initialization procedure that determines the first reference position based on satellite positioning data determined by the satellite navigation system.

5. The system of claim 4, wherein the satellite positioning data is provided to the PNT sensor module by at least one of a user input or a reference position signal output from the mobile relay module.

6. The system of claim 5, wherein the PNT sensor module further comprises a wireless transceiver configured to communicate data between the PNT sensor module and the mobile relay module.

7. The system of claim 6, wherein the wireless transceiver communicates the data using short-wavelength radio waves.

8. The system of claim 7, wherein the PNT sensor module further comprises at least one power source that powers the PNT sensor module and the low-power wireless transceiver.

9. The system of claim 8, wherein at least one power source includes at least one of a piezoelectric energy device, a saltwater fuel cell device, a battery and a solar power cell.

10. The system of claim 9, wherein the PNT sensor module moves independently from the mobile relay module while maintaining the range of communication.

11. The system of claim 1, wherein the PNT sensor module monitors navigation data output by the satellite navigation system, generates position data indicating the second position without utilizing satellite navigation system data, and outputs the PNT signal in response to detecting that the navigation data of the second position generated by the satellite navigation system does not match the position data corresponding to the second position.

12. A method of determining a position of an object without using a satellite navigation system, the method comprising:

moving the object from a first position to a second position;

measuring a plurality of different quantities of the object using a PNT sensor module included in an electronic navigation module that is coupled to the object in response to moving the object from the first position to the second position, and transmitting the measured quantities to a mobile relay module located remotely from the PNT sensor module at a first communication range, the measured quantities determined by the PNT sensor module indicating the second position of the PNT sensor module with respect to the first position, and relaying the measured quantities from the mobile relay module to at least one terminal device located remotely from the mobile relay module at a second communication range that is greater than the first communication range, the at least one terminal device configured to determine a location of the second position based on the measured quantities without communicating with the satellite navigation system, the measured quantities determined by a gyroscope unit configured to sense an angular momentum and determine an orientation of the PNT sensor module based on the sensed angular momentum, an accelerometer unit configured to sense an acceleration of the PNT sensor module, and a timing unit to determine a time period over which at least one of the gyroscope unit, the accelerometer unit and the magnetometer unit measures data; and disconnecting communication between the navigation module and the satellite navigation system in response to detecting a malfunction of the satellite navigation system, wherein the malfunction of the satellite navigation system is determined in response to detecting a hacking of the satellite navigation system, and wherein the PNT sensor module and the mobile relay module move simultaneously together with one another while maintaining the range of communication.

13. The method of claim 12, wherein the measured quantities include angular momentum, orientation, acceleration, speed, and a time period over which the object moves.

14. The method of claim 13, wherein the PNT sensor module selectively measures the quantities based on an operating status of the satellite navigation system, and wherein the mobile relay module determines the operating status of the satellite navigation system, and controls the PNT sensor module to begin measuring the quantities in response to detecting a loss of communication with the satellite navigation system.

15. The method of claim 14, wherein the measured quantities are transmitted across the first communication range using short-wavelength radio waves.

16. The method of claim 15, wherein the PNT sensor module moves independently from the mobile relay module while maintaining the range of communication.

* * * * *